United States Patent [19]

Sullivan

[11] Patent Number: 4,866,245

[45] Date of Patent: Sep. 12, 1989

[54] METHOD FOR MANUFACTURING A ROTARY ROCK BIT WITH IMPROVED WELD ROOT GEOMETRY

[75] Inventor: Eric C. Sullivan, Houston, Tex.

[73] Assignee: Hughes Tool Co., Houston, Tex.

[21] Appl. No.: 201,249

[22] Filed: Jun. 2, 1988

[51] Int. Cl.⁴ .............................................. B23K 9/02
[52] U.S. Cl. ................................................ 219/137 R
[58] Field of Search .................................... 219/137 R

[56] References Cited

U.S. PATENT DOCUMENTS

| | | | |
|---|---|---|---|
| 1,987,341 | 1/1935 | Kachel | 29/148.2 |
| 2,324,748 | 7/1943 | Welch | 76/108 |
| 2,615,236 | 10/1952 | Stulen et al. | 29/156.8 |
| 3,629,932 | 3/1970 | Richter | 29/472.1 |
| 4,255,641 | 3/1981 | Connell et al. | 219/61 |
| 4,258,247 | 3/1981 | Shimada et al. | 219/137 |
| 4,414,734 | 11/1983 | Atkinson | 29/464 |

OTHER PUBLICATIONS

Cary, Modern Welding Technology, 1979, pp. 506 and 507.

Primary Examiner—Clifford C. Shaw
Attorney, Agent, or Firm—Charles D. Gunter

[57] ABSTRACT

A method is shown for manufacturing rotary rock bits. The method reduces the effect of stresses in the area of the radial weld seams by providing a channel in the interior of the bit which intersects the root region of each weld, providing a generous radius for the root region of each radial weld.

6 Claims, 3 Drawing Sheets

METHOD FOR MANUFACTURING A ROTARY ROCK BIT WITH IMPROVED WELD ROOT GEOMETRY

BACKGROUND OF THE INVENTION

1. Field of the Invention

The present invention relates to earth boring bits and specifically to a welding method for welding a multiplicity of individual sections together to form a rock bit.

2. Description of the Prior Art

A rotary rock bit in general consists of a bit body made by welding separate sections together along seams between the sections. The body of a typical, contemporary bit is constructed of three sections, assembled to engage across 120 degree, machined faces and welded to form an integral body unit. A cone is mounted, on a cantilevered bearing shaft that extends from each section. The assembled bit has a connecting end for connection to a string of drill pipe for rotation about a vertical axis.

In recent years, attention has been focused on improvements to the welding and assembly procedures to improve the integrity of the rock bit. In the prior art method of manufacturing rotary rock bits, a radial weld groove was formed between adjacent sections of the bit. The radial weld groove had sidewalls which converged in an axial direction to form a root region, when viewed. The radial weld groove was filled with a weld deposit by a welding process. Surfaces on adjoining sections were in adjacent relationship but the surfaces were not joined together and the joining of the sections was through the weld deposit. In some cases, the welds were susceptible to failure along the seams, especially due to fatigue cracking. The fatigue cracks typically occurred in the non-fused, weld root region.

A need exists for an improved welding technique which will improve the resistance to failure, especially fatigue cracking, of the seams of rotary rock bits.

SUMMARY OF THE INVENTION

In the manufacturing method of the invention, a rotary rock bit is manufactured by welding separate sections of the bit together along seams between the sections, each section having two faces on its interior that intersect each other at 120 degrees to provide a centerline. The bit is assembled by bringing the bit sections together, the assembled sections forming upper, radial seams which lie in planes that radially intersect the centerline of the bit an d forming outside, axial seams which lie in planes generally parallel to the bit centerline.

A radial weld groove is formed along each of the radial seams formed between two of the bit sections. Each radial weld groove is welded to form a radial weld seam, each radial weld seam having an exterior, an interior, and a root region. The root geometry of each radial weld seam is modified by providing a longitudinal channel within the bit interior which runs generally parallel to the radial weld seam and which intersects the root region to form an arcuate opening when viewed in cross-section. The modified root geometry of the radial weld seams reduces the susceptibility of the bit to failure, especially due to fatigue cracking along the radial weld seams.

Additional objects, features and advantages will be apparent in the written description which follows.

DESCRIPTION OF THE PREFERRED EMBODIMENT

Figure 1:
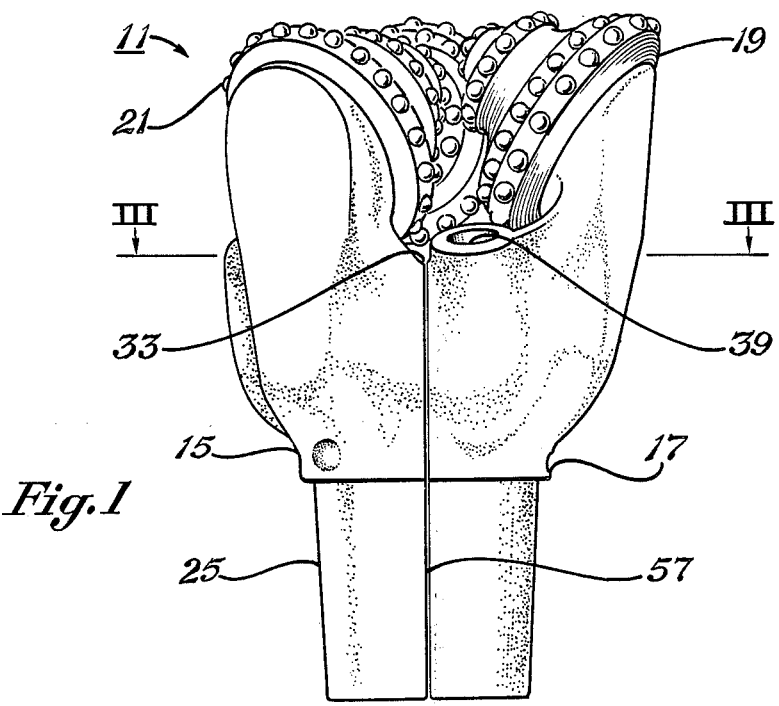
FIG. 1 is a side elevational view of a drill bit manufactured using the method of the invention showing the outside, axial seams thereof.

FIG. 1 shows a rotary rock bit, designated generally as 11, which is manufactured using the method of the invention. The rock bit 11 is manufactured by welding separate sections 13, 15, 17 of the bit together along seams between the sections. Each of the sections includes a rotatable cutter 19, 21, 23 which is mounted on a cantilevered bearing shaft which extends from the section and which has cutters thereon for disintegrating earthen formations. The assembled bit will be provided with a connecting end 25 for connection in a drill string for rotation about a vertical axis.

Figure 2:
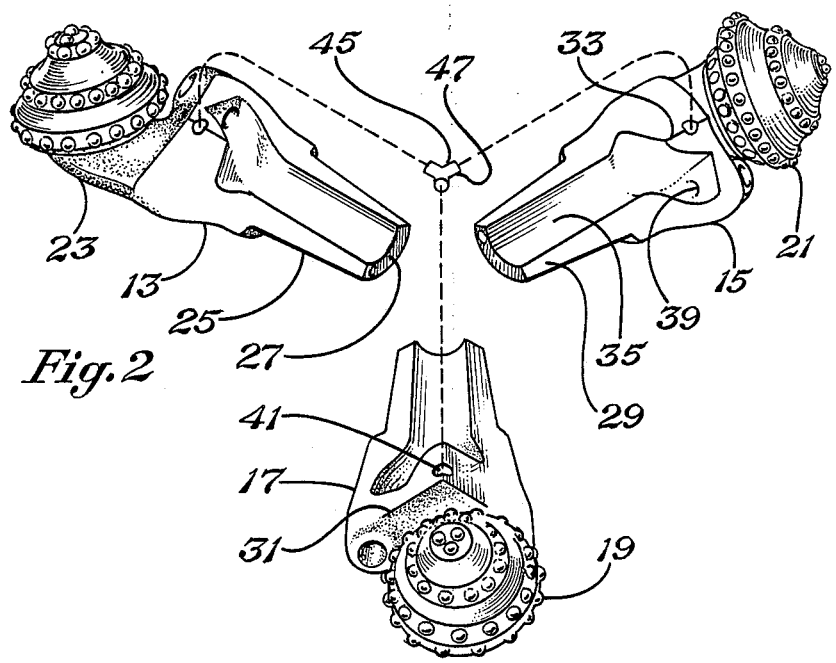
FIG. 2 is an exploded view of the bit sections of the bit of FIG. 1.

As shown in FIG. 2, each section 13, 15, 17 is an irregular shaped member having a shank 25 on one end and a rotatable cutter on the other end. When the sections 13, 15, 17 are welded together, the shanks 25 define a frusto-conical surface for being machined into a tapered set of threads (not shown). The shank 25 has a shank end 27 that is arcuate and extends 120 degrees. Shank end 27 lies in a plane perpendicular to the axis of the bit. Each section 13, 15, 17 has two faces 29 formed in it prior to assembly. Faces 29 extend from the crotch 31 to the shank end 27. Faces 29 are flat and intersect each other at 120 degrees. A 120 degree corner, termed herein centerline 33, is located at the intersection of the faces 29. Centerline 33 extends from the crotch 31 to a cavity 35. Cavity 35 is a channel that extends axially down each section to mate with the other sections to define an axial bore for the transmission of drilling fluid. One end of cavity 35 inclines and terminates in a smaller nozzle passage 39 for discharging the drilling fluid. Faces 29 extend on both sides of channel 35 and intersect each other at centerline 33 on the upper end of channel 35. The terms "upper" and "lower" as used herein refer to the assembly position of the bit as shown in FIG. 1.

A locking member or triad 45 is constructed for use in positioning the sections 13, 15, 17 together. A triad hole 41 is drilled in each centerline 33. Triad hole 41 is cylindrical and has an axis located on a radial line of the axis of the assembled drill bit 11. The axis of hole 41 equally bisects the section 17, and thus is at a 60 degree angle with respect to each face 29. Hole 41 intersect the vertical axis of the assembled bit 11 at a 90 degree angle.

In manufacturing the bit, first the bit sections are forged in their general configuration, including the channel 35. Then the faces 29 are machined smooth and flat so that a centerline 33 is provided at the proper 120 degree angle. The triad hole 41 is then drill in each section. Cutters 19, 21, 23 are assembled on the bearing pins of each section.

Figure 3:
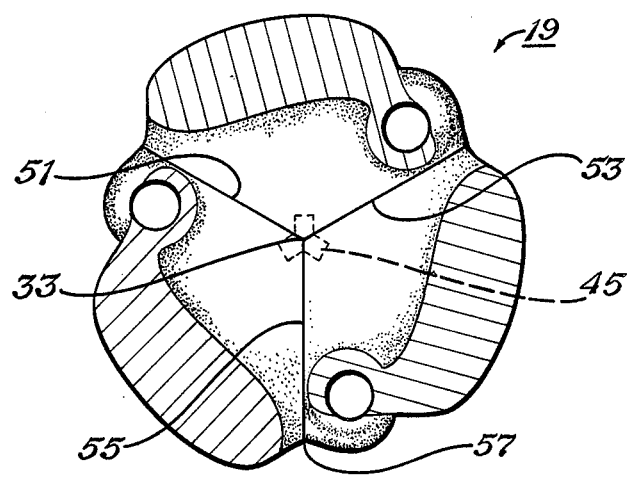
FIG. 3 is a sectional view of the drill bit of FIG. 1, taken along the line III—III of FIG. 1.

The bit sections are assembled in a suitable fixture for welding with the sections brought together about the triad pin, as shown in FIG. 3. A suitable fixture is shown in U.S. Pat. No. 4,414,734, to Atkinson, issued Nov. 15, 1983. The assembled sections form upper radial seams 51, 53, 55 (FIG. 3) which lie in planes that radially intersect the centerline 33 of the bit and form outside, axial seams (57 shown in FIG. 1) which lie in planes generally parallel to the bit centerline 33.

Figure 5:
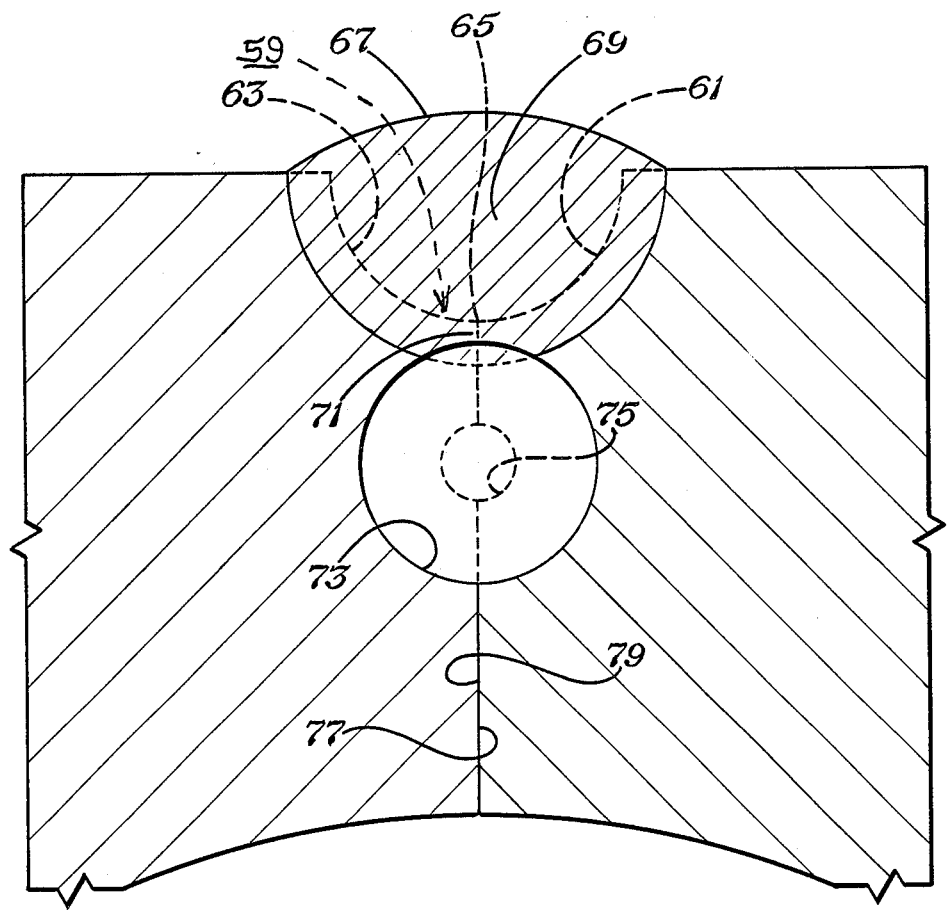
FIG. 5 is a schematic, end view of the longitudinal channel formed to intersect the weld root region of the radial weld seams provided in the drill bit of FIG. 4.

A radial weld groove is formed along each of radial seams 51, 53, 55 formed between two of the bit sections using standard welding techniques. For instance, an air carbon arc cutting torch can be used to cut a groove along each seam. As shown in FIG. 5, each radial weld groove 59 has sidewalls 61, 63 which converge inwardly to a root region 65, whereby the groove 59 assumes a concave shape when viewed in cross-section.

Figure 4:
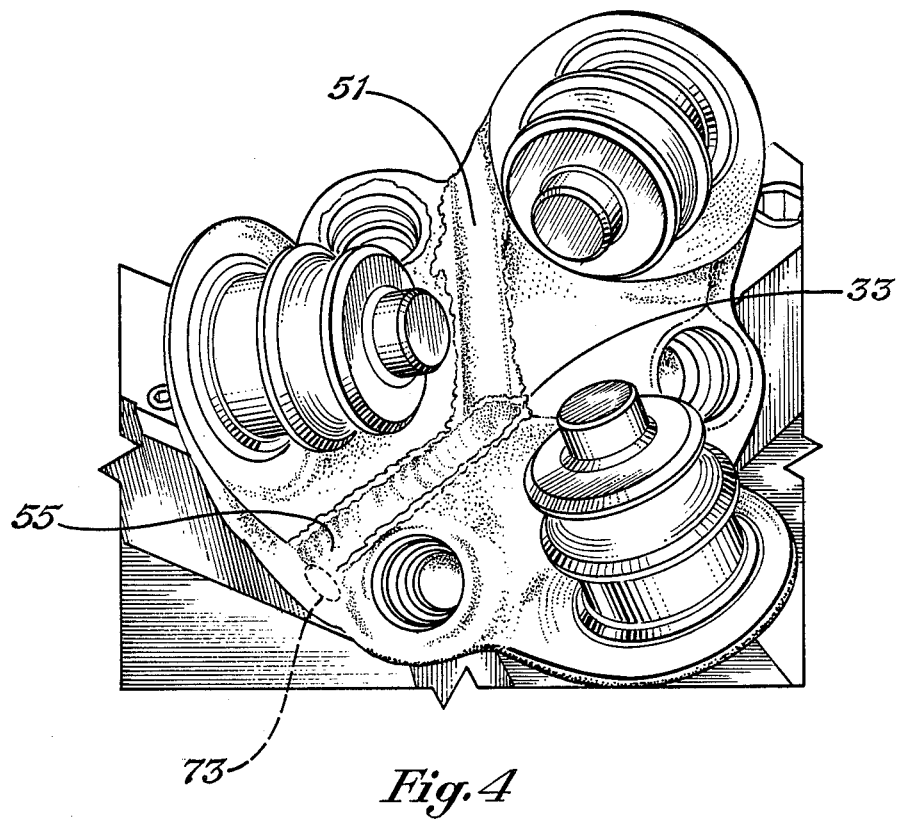
FIG. 4 is a top, perspective view of the drill bit of FIG. 1 with the cones removed, showing two of the completed radial weld seams.

The radial weld grooves 59 are then welded using conventional techniques to form radial weld seams, each seam having an exterior 67, an interior 69, and a root region 71. For instance, a gas shielded, flux-cored-arc wire welding torch can be used to from the radial weld seams. Notice that the metal surfaces 77, 79 of the bit sections are not welded and that the bit sections are joined only by the weld deposit in the weld groove 59. FIG. 4 shows the bit 11 with two of the radial seams 51, 55 filed with weld deposit.

The root geometry of the radial weld seam so formed is then modified by providing a longitudinal channel (73 in FIG. 5) which runs generally parallel to the radial weld seam through the interior of the bit and which intersects the weld root region 71 to form a circular opening, a portion of which cuts an arc through the weld root region when viewed in cross-section.

The longitudinal channel 73 can be formed by machining prior to welding each radial weld groove 59, or can be provided by machining after welding. For instance, the longitudinal channel 73 can be formed by drilling a hole, after each radial seam is welded, from the exterior of the bit in the direction of the centerline 33 which passes through a portion of the weld root region 71. As shown in FIG. 5, a smaller diameter pilot hole 75 can be drilled first to facilitate the drilling of the larger diameter hole making up the longitudinal channel 73.

The longitudinal channel can also be formed by machining an opening in each mating face 29 positioned to pass through a portion of the weld root region 71 after the seam is welded. The longitudinal channel can then be filled with a non-consumable insert prior to welding. For instance, a ceramic rod can be inserted in the hole 73 prior to welding the groove 59. Such materials do not fuse with the weld metal and can be used to provide a "radius", or curved lower extent, at the weld root region. The external hole through which the ceramic rod is inserted can be plug welded from the exterior of the bit.

The following example is intended to be illustrative of the invention:

EXAMPLE I

Prior to assembling two 7⅞" J33H bits, a pilot hole was prepared for each longitudinal channel by milling a semi-circular groove in each 120 degree mating face of the bit sections. When the sections were assembled, a pilot hole ⅜" diameter and 2.75 inches in length was provided by the mating grooves. A radial weld groove was provided in the forgings, as shown in FIG. 5. The sections were assembled using a standard gage ring. The bits contained triads, and shims were used in the crotch area to bring the bits out to gage. The radial welds were made using the gas shielded flux cored arc welding process. The weld penetration was approximately 1/16". A hole approximately ⅜" in diameter was then drilled though each of the pilot holes to provide the finished longitudinal channel in the bit interior. The channel removed approximately 1/32" from the root of the axial weld leaving an arcuate opening or "radius" in the root region. Grooves were then gouged out in the axial seams, the longitudinal channels were plug welded, and the axial seams were welded. The bits so produced were less susceptible to failure in the radial weld area than were prior art bits.

An invention has been provided with several advantages. The method of the invention reduces the susceptibility of radial weld seams to fail in use, especially due to fatigue cracking that initiates from the non-fused weld root area. The modification to the root geometry can by easily accomplished by machining before or after welding. If the root geometry is modified by inserting a ceramic rod in the longitudinal channel, a further processing improvement results. During welding, variations in penetration will still result in a uniform root area geometry.

While the invention has been shown in only one of its forms, it is not thus limited but is susceptible to various changes and modifications without departing from the spirit thereof.

What is claimed is:

1. A method for manufacturing a rotary rock bit by welding separate sections of the bit together along seams between the sections, each section having two faces on its interior that intersect each other at 120 degrees to provide a centerline, comprising the steps of:
    assembling the bit by bringing the bit sections together, the assembled sections forming upper, radial seams which lie in planes that radially intersect the centerline of the bit and forming outside, axial seams which lie in planes generally parallel to the bit centerline;
    forming a radial weld groove along each of the radial seams formed between two of the bit sections;
    welding each radial weld groove to form a radial weld seam, each radial weld seam having an exterior, an interior, and a root region;
    modifying the root geometry of each radial weld seam so formed by providing a longitudinal channel within the bit interior which runs generally parallel to the radial weld seam and which intersects the root region thereof, thereby reducing the susceptibility of the radial weld seams to failure during use, the longitudinal channel being provided by machining after welding each radial weld groove.

2. The method of claim 1, wherein the longitudinal channel is provided by drilling a hole, after each radial seam is welded, from the exterior of the bit in the direction of the centerline which passes through a portion of the weld root region.

3. A method for manufacturing a rotary rock bit by welding separate sections of the bit together along seams between the sections, each section having two faces on its interior that intersect each other at 120 degrees to provide a centerline, comprising the steps of:
    assembling the bit by bringing the bit sections together, the assembled sections forming upper, radial seams which lie in planes that radially intersect the centerline of the bit and forming outside, axial seams which lie in planes generally parallel to the bit centerline;

forming a radial well groove along each of the radial seams formed between two of the bit sections;

welding each radial weld groove to form a radial weld seam, each radial weld seam having an exterior, an interior, and a root region, each radial weld seam decreasing in cross-sectional area from the exterior through the interior thereof;

modifying the root geometry of each radial weld seam so formed by providing a longitudinal channel within the bit interior which runs generally parallel to the radial weld seam through the interior of the bit and which intersects the weld root region to form an arcuate opening when viewed in cross-section, thereby reducing the susceptibility of the radial weld seams to failure during use.

4. A method for manufacturing a rotary rock bit by welding separate sections of the bit together along seams between the sections, each section having two faces on its interior that intersect each other at 120 degrees to provide a centerline, comprising the steps of:

assembling the bit by bringing the bit sections together, the assembled sections forming upper, radial seams which lie in planes that radially intersect the centerline of the bit and forming outside, axial seams which lie in planes generally parallel to the bit centerline;

providing a first radial weld groove at a selected one of the radial seams formed between two of the bit sections;

providing a second and third radial weld grooves at the remaining radial seams;

welding the first radial weld groove to form a radial weld seam, the radial weld seam having an exterior, an interior, and a root region, the radial weld seam having sidewalls with converge in an axial direction whereby the radial weld seam decreases in cross-sectional area from the exterior through the interior thereof;

welding the second and third radial weld grooves;

modifying the root geometry of each of the radial weld seams so formed by providing a longitudinal channel which runs generally parallel to the radial weld seam through the interior of the bit and which intersects the weld root region to form an arcuate opening when viewed in cross-section; and providing outside, axial weld groves which intersect each radial weld seam and welding the outside, axial weld grooves.

5. A method for manufacturing a rotary rock bit by welding separate sections of the bit together along seams between the sections, each section having two faces on its interior that intersect each other at 120 degrees to provide a centerline, comprising the steps of:

assembling the bit by bringing the bit sections together, the assembled sections forming upper, radial seams which lie in planes that radially intersect the centerline of the bit and forming outside, axial seams which lie in planes generally parallel to the bit centerline;

forming a radial weld groove along each of the radial seams formed between two of the bit sections, each radial weld groove having an exterior, an interior and a root region;

providing a longitudinal channel within the bit interior which runs parallel to each radial weld groove and which intersects the root region thereof to form an arcuate opening when viewed in cross-section;

filling each longitudinal channel with a non-consumable insert prior to welding; and welding each radial weld groove to form a radial weld seam.

6. A method for manufacturing a rotary rock bit by welding separate sections of the bit together along seams between the sections, each section having two faces on its interior that intersect each other at 120 degrees to provide a centerline, comprising the steps of:

assembling the bit by bringing the bit sections together, the assembled sections forming upper, radial seams which lie in planes that radially intersect the centerline of the bit and forming outside, axial seams which lie in planes generally parallel to the bit centerline;

providing a first radial weld groove at a selected one of the radial seams formed between two of the bit sections;

providing a second and third radial weld grooves at the remaining radial seams;

providing a longitudinal channel within the bit interior which runs parallel to each radial weld groove and which intersects the root region thereof to form an arcuate opening when viewed in cross-section;

filling each longitudinal channel with a non-consumable insert prior to welding;

welding the first radial weld groove to form a radial weld seam;

welding the second and third radial weld grooves; and providing outside, axial weld grooves which intersect each radial weld seam and welding the outside, axial weld grooves.

* * * * *